UNITED STATES PATENT OFFICE 2,056,539

AZO-DYESTUFFS AND PROCESS OF MAKING SAME

Hans Schindhelm, Richard Gast, and Richard Fleischhauer, Frankfort-on-the-Main-Fechenheim, Germany, assignors to General Aniline Works, Inc., New York, N. Y., a corporation of Delaware No Drawing. Application February 21, 1933, Serial No. 657,924. In Germany February 29, 1932

3 Claims. (Cl. 260—44.2)

This invention relates to azo-dyestuffs and to a process of making same.

The copending U. S. application Ser. No. 657,923, filed on the same date, describes the manufacture of azo-dyestuffs by linking two molecules of azo-dyestuffs derived from diazotized nitro-amino-stilbene- (or dibenzyl-) disulfonic acid by a suitable conversion of the nitrogen-containing groups and by subjecting the products thus obtained if desired to an aftertreatment usual for stilbene- and azo-dyestuffs.

In accordance with the present invention the starting materials used for the process of the aforesaid application are likewise transformed into direct cotton dyestuffs by linking one molecule thereof (instead of with an equal molecule) with a different aromatic radical.

Such linking is effected by condensing the nitro-group with an amine or by reducing the nitro-group and using the diazo-compound of the formed amino-body for making poly-azo-dyes.

Thus in a smooth manner unsymmetrical azo-dyestuffs are obtained, which are like the products of U. S. application Ser. No. 657,923, filed on the same date, distinguished by a good affinity for vegetable fibers.

These new dyestuffs of the stilbene series correspond to the probable general formula:

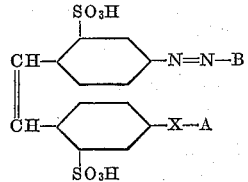

wherein X means an azo- or azoxy-group, A means an aromatic radical which may contain further azo-groups and B means the radical of a coupling component which may be alkylated.

It is already known to produce unsymmetrical dis-azo-dyestuffs of the stilbene series by condensing dinitro-stilbene-disulfonic acid with two different amines or by tetrazotizing diamino-stilbene-disulfonic acid and combining with two different coupling components. These processes, however, show the disadvantage that the products obtained are rendered impure to a more or less high degree by symmetrical disazo-dyestuffs.

In order to further illustrate our invention the following examples are given, the parts being by weight and all temperatures in centigrade degrees; but it is, however, to be understood that our invention is not limited to the particular products or reacting conditions mentioned therein:

Example 1

56.3 parts of the methylated mono-azo-dyestuff nitro-disulfo-stilbene-azo-phenol are dissolved in 1050 parts of water and 140 parts of caustic soda lye of 35° Bé. Then 14 parts of p-phenetidine are added to the solution and the mass is boiled under reflux for about 25 hours. The excess of lye is neutralized by means of hydrochloric acid; when cool the reaction product is filtered off by suction and washed out by means of saltwater of 10° Bé. The dried dyestuff which corresponds to the probable formula:

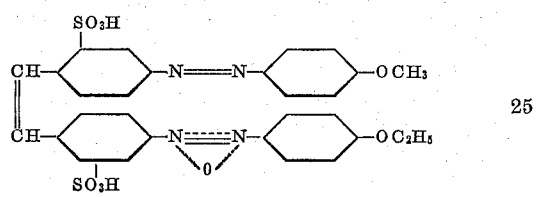

represents an orange-brown powder, dissolving in water with a pure yellow, in concentrated sulfuric acid with a reddish violet color and dyeing cotton bright yellow shades, fast to chlorine and light.

By starting, instead of from the methylated, from the ethylated mono-azo-dyestuff, a product of nearly similar properties is obtained.

Example 2

56.3 parts of the starting material of the foregoing example are dissolved in 1250 parts of water and 200 parts of caustic soda lye of 35° Bé. Then a solution of 34.2 parts of the sodium salt of dehydro-thio-toluidine-sulfonic acid in 250 parts of water is added and the whole is boiled under reflux for about 25 hours. When cool the formed dyestuff is filtered off by suction, if necessary, the precipitation is completed by the addition of common salt. The dried dyestuff thus obtained corresponds probably to the following formula:

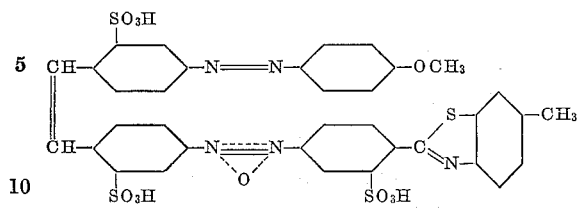

It represents a brownish orange-red powder, which dissolves in water with an orange-yellow, in concentrated sulfuric acid with a bluish violet color and which dyes cotton orange shades, fast to light and chlorine.

The condensation may also be carried out in a closed vessel under superatmospheric pressure.

By after-treating the solution of the product with an oxidizing agent, as e. g. with a solution of hypochlorite, the fastness to washing and the shade may be improved.

*Example 3*

56.3 parts of the starting material used in the foregoing examples and 32.1 parts of the dyestuff, obtained from diazotized aniline-m-sulfonic acid and 1-methyl-3-amino-4-methoxy-benzene, are dissolved in 1500 parts of water and 215 parts of caustic soda lye of 35° Bé. and heated under reflux to boiling for about 20 hours. After cooling down the reaction product is filtered off by suction. The dried dyestuff thus obtained corresponds to the probable formula:

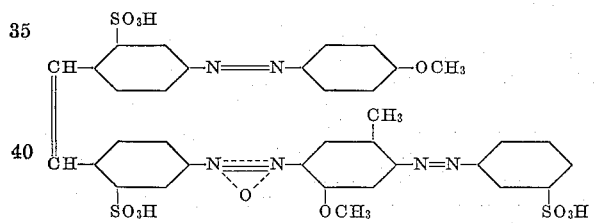

and represents a reddish brown powder, dissolving in water with an orange-brown, in concentrated sulfuric acid with a gray-violet color. It dyes cotton orange-brown shades, which are fast to chlorine.

With a similar result the methylated starting-dyestuff may be replaced for example by the ethylated dyestuff.

The condensation can be accelerated by working in a closed vessel under superatmospheric pressure.

By an after-treatment of the product with an oxydizing agent, as e. g. a solution of hypochlorite, the purity of the shade and the fastness to washing may be improved.

*Example 4*

By replacing in the foregoing example the dyestuff of the metanilic acid by 32.7 parts of the dyestuff, obtained from diazotized sulfanilic acid and 1-naphthylamine, after a 22 hours' boiling, filtration and cooling a dyestuff is obtained which corresponds pobably to the following formula:

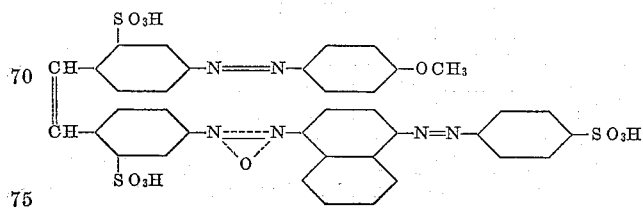

It represents when dry a brown powder, dissolving in water with an orange red-brown, in concentrated sulfuric acid with a violet-brown color, dyeing cotton orange red-brown shades fast to light and to chlorine.

By using, instead of the methylated starting product, the ethyl-compound, a product of nearly the same properties is produced.

*Example 5*

50.3 parts of the product, obtained by methylating and subsequently reducing by means of sodium sulfide the dyestuff derived from diazotized 4 - nitro - 4' - amino - stilbene - 2,2' - disulfonic acid and phenol, are dissolved in the necessary quantity of sodium carbonate. While cooling by means of ice, a solution of 6.7 parts of sodium nitrite is added and the whole is acidified by means of hydrochloric acid. The mass is stirred until the sodium nitrite is consumed, the acid is neutralized until a weak Congo-reaction by the addition of some sodium acetate. The reddish brown colored diazo-suspension is allowed to run into an aqueous suspension of 31.9 parts of 1-amino-8-naphthol-4,6-disulphonic acid, to which a solution of about 100 parts of the hydrochloride of pyridine may be added. When the combination is finished, say after some hours, the green dyestuff may be isolated in the usual manner. The paste of the dyestuff is again suspended by means of water and combined in the presence of sodium carbonate or pyridine with the diazo-compound of 15.4 parts of 4-nitro-2-amino-1-phenol.

The acid and alkaline combination may be carried out without isolating the intermediate dyestuff.

If necessary the dyestuff produced is purified; after isolating and drying it forms a dark water-soluble powder, corresponding to the probable formula

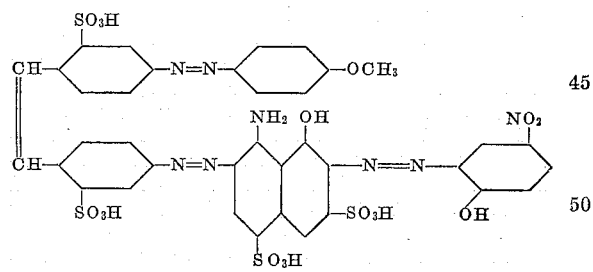

dyeing cotton yellowish green shades, which become fast to light by after-treatment with copper on the fiber, without essentially changing their shade.

By transforming the dyestuff in a known manner into the copper-compound, a product is obtained, being still well soluble and dyeing cotton green shades fast to light.

The final combination may also be carried out in the presence of copper-salts, whereby a similar copper-dyestuff is obtained.

Similar green substantive dyestuffs may be produced by replacing e. g. 4-nitro-2-amino-1-phenol by the equivalent amounts of: 5-nitro- 2-amino-benzoic acid, 4-nitro-2-amino-1-anisol, 4-chloro-2-amino-1-anisol, picramic acid, 6-chloro-4-nitro-amino-phenol and so on.

The diazo-compound of the above named methylated and reduced dyestuff from 4-nitro-4'-amino-stilbene-2,2'-disulfonic acid and phenol may be replaced by the diazo-compound of other dyestuffs from 4-nitro-4'-amino-stilbene-disulfonic acid with a component, usual for the production of yellow azo-dyestuffs, as e. g. salicylic acid, acetoacetic acid anilide and so on, whereby dyestuffs of similar properties are produced. By replacing the component, usual for the production of yellow azo-dyestuffs, by other combining components of the benzene- or naphthalene-series, dyestuffs of more bluish or darker brown shades are obtained.

*Example 6*

The dyestuff, obtained from diazotized 4-nitro-4'-amino-stilbene-2,2'-disulfonic acid and phenol, is methylated, reduced and diazotized. This diazo-compound is combined in a mineral acid medium with 1-amino-8-naphthol-4,6-disulfonic acid and the dyestuff thus formed is again combined in an alkaline medium with a second molecule of the same diazo-compound. In this manner a dyestuff is obtained which corresponds to the probable formula

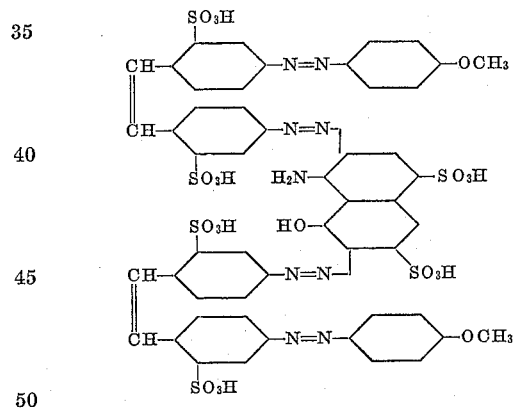

and which represents after isolating and drying a water-soluble dark powder dyeing cotton very strong green shades.

By replacing the 1-amino-8-naphthol-4,6-disulfonic acid by the equivalent amount of resorcin, a dyestuff is obtained dyeing leather reddish brown shades.

*Example 7*

The diazo-compound of the methylated and reduced dyestuff from diazotized 4-nitro-4'-amino-stilbene-2,2'-disulfonic acid and phenol, obtained according to Example 5, is allowed to run into an acetic acid suspension of 27.1 parts of 2-amino-5-naphthol-7-sulfonic acid. When the coupling is finished the dyestuff is warmed, precipitated by the addition of common salt, filtered off and washed out. The paste of the dyestuff is redissolved by means of water under the addition of sodium carbonate and combined with the diazo-solution, prepared from 12.3 parts of o-anisidine. The dyestuff thus obtained corresponds to the probable formula

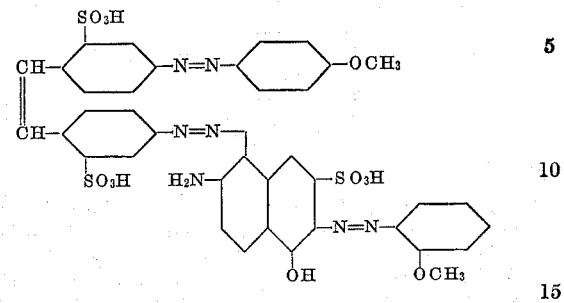

and represents after isolating and drying a water-soluble black-brown powder, dyeing cotton bluish red shades.

By combining 2-amino-5-naphthol-7-sulfonic acid in an acetic acid medium with diazotized aniline and subsequently combination of the dyestuff thus formed in a medium of sodium carbonate with the repeatedly named diazo-compound of the methylated and reduced dyestuff from 4-nitro-4'-amino-stilbene-2,2'-disulfonic acid and phenol, a brown dyestuff is obtained.

*Example 8*

12 parts of the dis-azo-dyestuff nitro-amino-stilbene-disulfonic-acid-azo-α-naphthylamine-azo-salicylic acid are boiled for 20 hours with 8.4 parts of dehydro-thio-toluidine-sulfonic acid in 150 parts of normal caustic alkali lye. The isolated and dried dyestuff which corresponds to the probable formula:

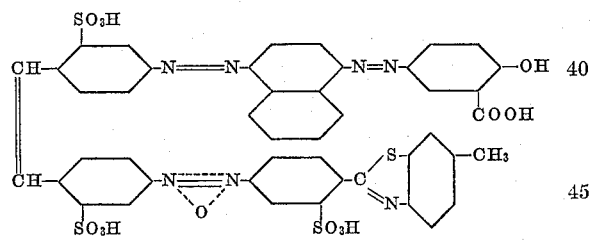

represents a brownish black powder, dissolving in water with a brown, in concentrated sulfuric acid with a blue color, dyeing cotton pure yellow-brown shades of good fastness qualities.

A similar dyestuff may be obtained by using, instead of the dehydro-thio-toluidine-sulfonic acid, e. g. amino-azo-benzene-mono-sulfonic acid.

We claim:

1. The azo-dyestuff of the formula

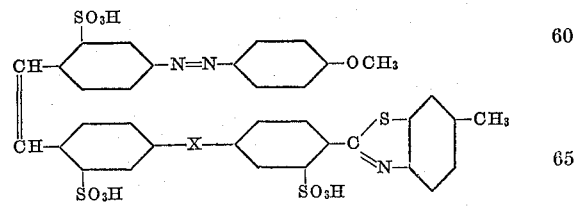

wherein X stands for a member of the group consisting of azo- and azoxy-groups which dyestuff represents a brownish orange-red powder, which dissolves in water with an orange-yellow, in concentrated sulfuric acid with a bluish violet color and dyes cotton orange shades, fast to light and chlorine.

2. The process which comprises condensing in the presence of alkali a nitro-stilbene-azo-dyestuff of the general formula

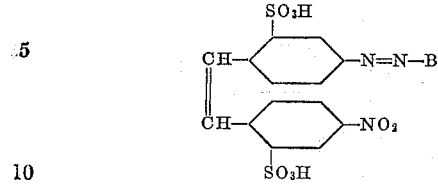

wherein B stands for a coupling component selected from the group consisting of alkylated and non-alkylated groups, with a member of the group consisting of primary aromatic amines and primary aromatic amines containing further azo groups.

3. The process which comprises condensing in the presence of alkali the nitro-stilbene-azo-dyestuff of the formula

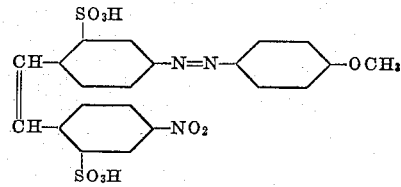

with dehydro-thio-toluidine-sulfonic acid.

HANS SCHINDHELM.
RICHARD GAST.
RICHARD FLEISCHHAUER.